H. W. PELL,

Assignor, by mesne assignments, to W. H. BEEBE.

Harvester.

No. 9,326. Reissued Aug. 3, 1880.

Witnesses

W. C. Godley

Jno. C. Mackenzie

Inventor

Henry W. Pell

By Coburn & Thacher

Attorneys

N. PETERS, PHOTO-LITHOGRAPHER, WASHINGTON, D. C.

UNITED STATES PATENT OFFICE.

HENRY W. PELL, OF ROME, NEW YORK, ASSIGNOR, BY MESNE ASSIGNMENTS, TO WILLIAM H. BEEBE.

HARVESTER.

SPECIFICATION forming part of Reissued Letters Patent No. 9,326, dated August 3, 1880.

Original No. 73,642, dated January 21, 1868. Application for reissue filed June 16, 1880.

*To all whom it may concern:*

Be it known that I, HENRY W. PELL, of Rome, in the county of Oneida and State of New York, have invented a new and useful Improvement in Draft Attachments for Harvesters, which is fully described in the following specification, reference being had to the accompanying drawings, in which—

Figure 1:
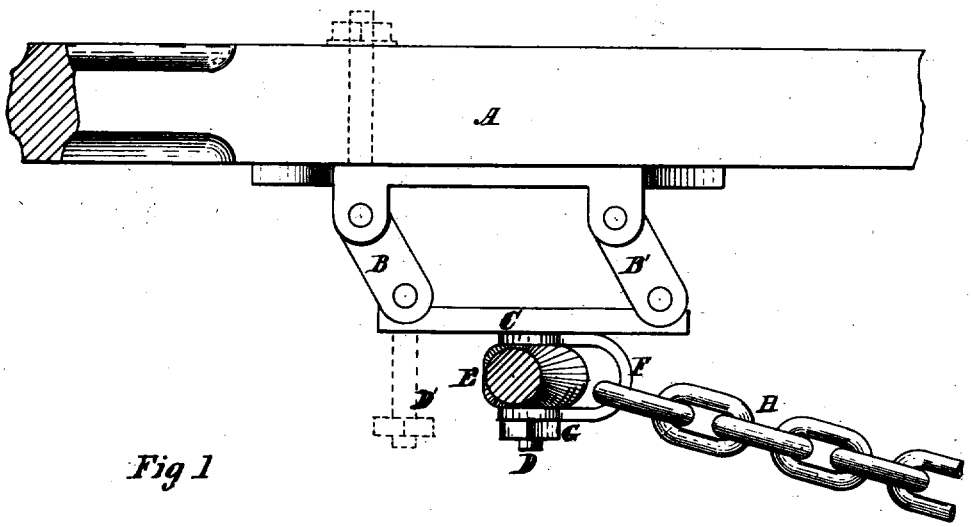
Figure 2:
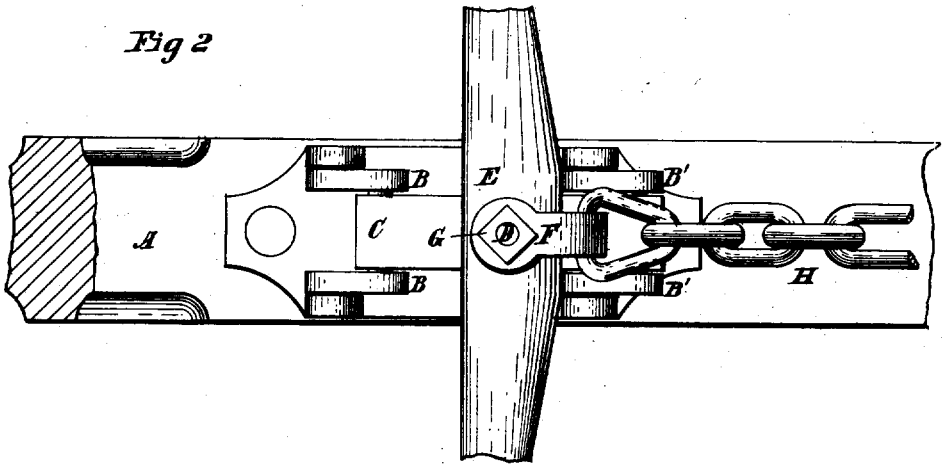

Figure 1 is a side elevation of a portion of the tongue of a harvester with draft attachments illustrating my invention, and Fig. 2 is an under-side view of the same.

My invention relates to a draft attachment for harvesters which is intended to provide for a backward and forward movement of the double-tree or whiffletree, as the case may be.

The invention consists in the combination of the draft attachment with one or more pairs of swinging arms, to which it is connected, and which are hinged or pivoted to the tongue so as to be free to swing backward and forward in the line of the draft.

It also consists in special devices and combinations of devices for carrying out my invention, all of which will be hereinafter more fully described, and the novel improvements pointed out more definitely in the claims.

In the accompanying drawings I have illustrated one method of carrying out my invention, which I will now proceed to describe.

In these drawings, A represents the tongue of the machine. B B′ are two pairs of pendent arms pivoted to a plate on the under side of the tongue, and carrying at their lower extremities a longitudinal bar, C, to which the double-tree bolt or stud D is rigidly attached. E represents the double-tree, and F the draft-clevis, which are confined upon the stud D by a nut, G. H is the draft-chain, extending from the clevis F back to the frame of the machine.

By this arrangement the whiffletrees or double-trees are securely held against lateral displacement; an upward draft is communicated to the beam to carry it easily over obstructions, and by the free longitudinal play afforded to the draft attachments the cutting apparatus is caused to conform freely and easily to inequalities in the surface of the ground.

If preferred, a single pair of pendent arms, B B, may be used, pivoted at their upper ends to a T-headed bolt passing through the tongue, and at their lower ends to a T-headed bolt, D′, as illustrated in dotted lines in Fig. 1, the double-tree and draft-clevis being mounted on the bolt D′.

In both constructions above described, the device to which the draft is attached being free to swing backward and forward on a pivotal joint or joints, the movement of the attachment back and forth is effected with very little friction, and there is no friction whatever upon the whiffletree or double-tree.

Having thus described my invention, what I claim as new, and desire to secure by Letters Patent, is—

1. One or more pairs of swinging arms hinged or pivoted at one end to the tongue, in combination with the draft-attaching device connected to and carried by said pair or pairs of arms, substantially as described.

2. The longitudinal bar C, carrying the stud or bolt D, on which the draft-attaching device is mounted, in combination with the swinging arms B B′, connected at their upper ends to the tongue by a hinged or pivotal joint, substantially as described.

3. One or more pairs of swinging arms, B, supporting the draft-clevis and whiffletree-bolt vertically and laterally and permitting their free play longitudinally.

HENRY W. PELL.

Witnesses:
E. R. PELL,
W. B. PELL.